(12) United States Patent
Yamazaki et al.

(10) Patent No.: US 9,513,114 B2
(45) Date of Patent: Dec. 6, 2016

(54) MEASURING DEVICE, MEASURING METHOD, AND COMPUTER PROGRAM PRODUCT

(71) Applicant: KABUSHIKI KAISHA TOSHIBA, Minato-ku, Tokyo (JP)

(72) Inventors: Masaki Yamazaki, Fuchu (JP); Akihito Seki, Yokohama (JP); Satoshi Ito, Kawasaki (JP); Yuta Itoh, Kawasaki (JP); Hideaki Uchiyama, Kawasaki (JP); Ryuzo Okada, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 142 days.

(21) Appl. No.: 14/200,286

(22) Filed: Mar. 7, 2014

(65) Prior Publication Data

US 2014/0285816 A1    Sep. 25, 2014

(30) Foreign Application Priority Data

Mar. 25, 2013   (JP) .................................. 2013-062977

(51) Int. Cl.
  *G01B 11/25* (2006.01)
(52) U.S. Cl.
  CPC ....... *G01B 11/2509* (2013.01); *G01B 11/2513* (2013.01)
(58) Field of Classification Search
  CPC .............. H04N 9/8047; G06F 1/1626; G06F 12/0866
  USPC ............. 356/601–613; 348/180–188, 207.99
  See application file for complete search history.

(56) References Cited

U.S. PATENT DOCUMENTS

| 4,175,862 A | * | 11/1979 | DiMatteo | ............. | G01B 11/245 250/558 |
| 4,511,252 A | * | 4/1985 | Di Matteo | ........... | G01B 11/245 356/610 |

(Continued)

FOREIGN PATENT DOCUMENTS

JP    2010-281778    12/2010

OTHER PUBLICATIONS

Sansoni et al, A 3D Vision System Based on One-Shot Projection and Phase Demodulation for Fast Profilometry, Meas. Sci. Tech 16: pp. 1109-1118, 2005.

(Continued)

*Primary Examiner* — Kara E Geisel
*Assistant Examiner* — Dominic J Bologna
(74) *Attorney, Agent, or Firm* — Amin, Turocy & Watson LLP

(57) ABSTRACT

According to an embodiment, a measuring device includes a projector, an image capturing unit, and a first calculator. The projector projects, onto a target, a first superimposed pattern which is obtained by superimposing a first pattern having a periodic change and a second pattern configured with a first design for specifying a period of the first pattern. The image capturing unit captures the target, onto which the first superimposed pattern is projected to obtain an image. The first calculator performs matching of the first design taken by the image capturing unit, which is included in the first superimposed pattern in the image, with the first design projected by the projecting unit, and calculates correspondence between a second superimposed pattern, which points to the first superimposed pattern captured in the image, and the first superimposed pattern.

13 Claims, 9 Drawing Sheets

(56) References Cited

U.S. PATENT DOCUMENTS

| | | | | |
|---|---|---|---|---|
| 5,613,013 | A * | 3/1997 | Schuette | G06K 9/32 356/400 |
| 6,376,818 | B1 * | 4/2002 | Wilson | G06T 7/0057 356/609 |
| 7,911,500 | B2 * | 3/2011 | Uchihashi et al. | 348/207.99 |
| 2003/0016366 | A1 * | 1/2003 | Takeda | G06T 7/0057 356/604 |
| 2006/0050284 | A1 * | 3/2006 | Bertin-Mourot | G01B 11/25 356/612 |
| 2008/0030744 | A1 | 2/2008 | Beardsley | |
| 2010/0284589 | A1 * | 11/2010 | Thiel | G01B 11/2518 382/128 |
| 2013/0286408 | A1 * | 10/2013 | Castillo | G01B 11/2513 356/610 |

OTHER PUBLICATIONS

Japanese Office Action for Japanese Patent Application No. 2013-062977 mailed on Jul. 26, 2016. English Translation obtained from USPTO Global Dossier on Sep. 26, 2016—Dictionary last updated on Jul. 24, 2016.

\* cited by examiner

R CHANNEL　　　G CHANNEL　　　B CHANNEL
　　　30-R　　　　　　30-G　　　　　　30-B

MONOCHROMATIC
CHANNEL

PHASE: (-π TO π), (-π TO π),
(-π TO π), (-π TO π),

MEASURING DEVICE, MEASURING METHOD, AND COMPUTER PROGRAM PRODUCT

CROSS-REFERENCE TO RELATED APPLICATIONS

This application is based upon and claims the benefit of priority from Japanese Patent Application No. 2013-062977, filed on Mar. 25, 2013; the entire contents of which are incorporated herein by reference.

FIELD

Embodiments described herein relate generally to a measuring device, a measuring method, and a computer program product.

BACKGROUND

As far as measuring the three-dimensional shape of a non-textured target surface such as that of a metal is concerned, a phase shift method is known in which the three-dimensional shape of the target surface is measured by projecting a plurality of sinusoidal wave patterns having different phases onto the target surface; taking an image of the target surface having the sinusoidal wave patterns projected thereon; and calculating phases from the sinusoidal wave patterns captured in the image.

Another technology is also known in which RGB patterns having the phase shifted for each color channel are used as a plurality of sinusoidal wave patterns having different phases, and in which the three-dimensional shape of the target surface is measured by projecting a plurality of such sinusoidal wave patterns onto the target surface at once.

In the conventional technology mentioned above, if the target surface is smooth in nature and if the projected patterns are reflected to a satisfactory extent, then it is possible to measure the three-dimensional surface of the target surface. However, in case it is not possible to achieve satisfactory reflection of the projected patterns, then there are times when the phases of the projected patterns cannot be calculated in a correct manner from the image in which the patterns projected onto the target surface are captured. In such a case, it is not possible to measure the three-dimensional shape of the target surface.

DETAILED DESCRIPTION

According to an embodiment, a measuring device includes a projector, an image capturing unit, and a first calculator. The projector projects, onto a target, a first superimposed pattern which is obtained by superimposing a first pattern having a periodic change and a second pattern configured with a first design for specifying a period of the first pattern. The image capturing unit captures the target, onto which the first superimposed pattern is projected to obtain an image. The first calculator performs matching of the first design taken by the image capturing unit, which is included in the first superimposed pattern in the image, with the first design projected by the projecting unit, and calculates correspondence between a second superimposed pattern, which points to the first superimposed pattern captured in the image, and the first superimposed pattern.

Various embodiments are described below in detail with reference to the accompanying drawings.

First Embodiment

Figure 1:
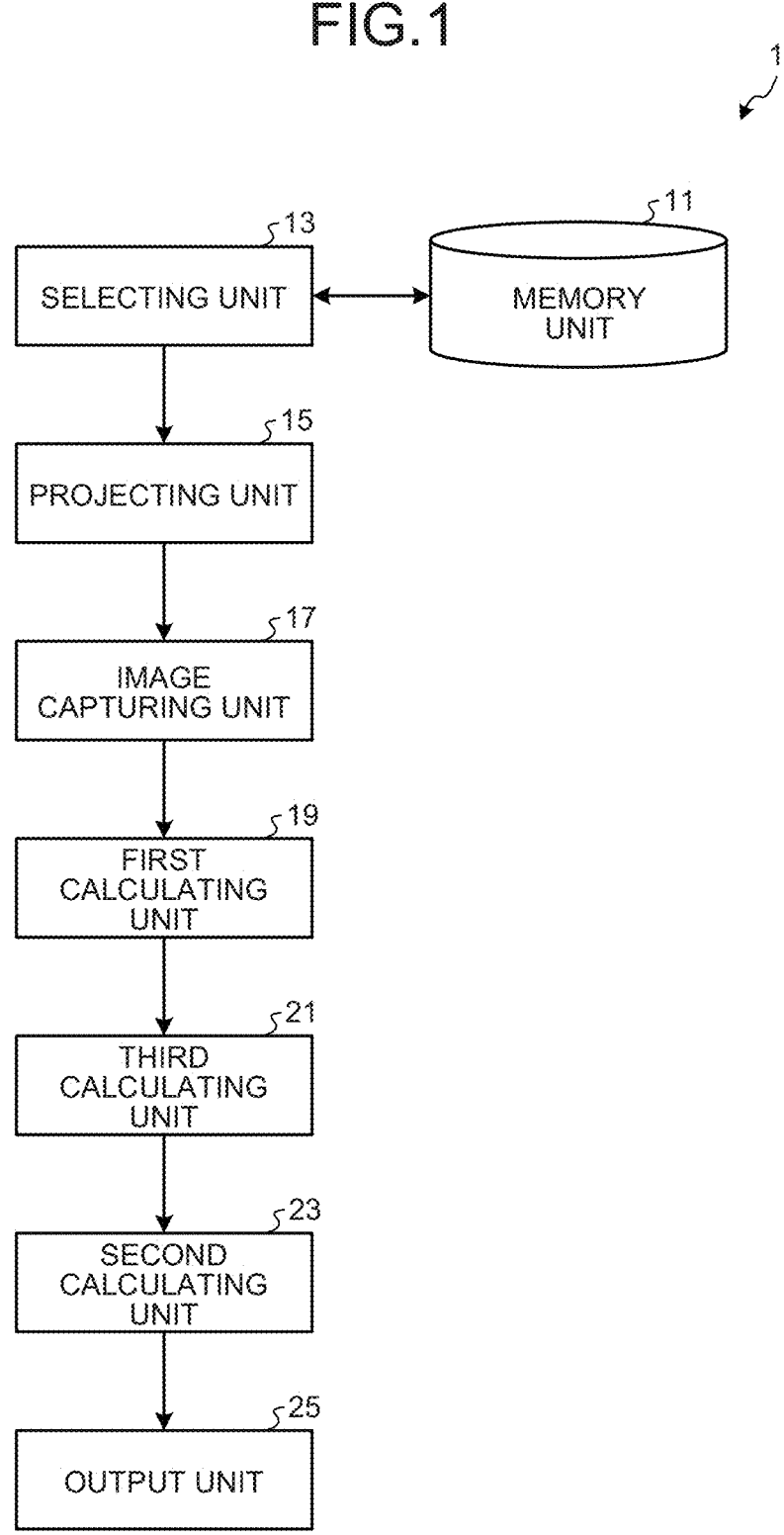
FIG. 1 is a diagram illustrating an example of a measuring device according to a first embodiment.

FIG. 1 is a diagram illustrating an example of a measuring device 1 according to a first embodiment. As illustrated in FIG. 1, the measuring device 1 includes a memory unit 11, a selecting unit 13, a projecting unit 15, an image capturing unit 17, a first calculating unit 19, a third calculating unit 21, a second calculating unit 23, and an output unit 25.

The memory unit 11 is used to store various computer programs executed in the measuring device 1 and to store data that is used in various operations performed in the measuring device 1. The memory unit 11 is implemented using a memory device such as a hard disk drive (HDD), a solid state drive (SSD), a memory card, an optical disk, a read only memory (ROM), or a random access memory (RAM) in which information can be stored in a magnetic, optical, or electrical manner.

The selecting unit 13, the first calculating unit 19, the third calculating unit 21, and the second calculating unit 23 can be implemented by executing computer programs in a processor such as a central processing unit (CPU), that is, can be implemented using software; or can be implemented using hardware such as an integrated circuit (IC); or can be implemented using a combination of software and hardware.

The projecting unit 15 can be implemented using a projecting device such as a projector, a laser, or a lamp that is capable of projecting pattern light of arbitrary patterns from a light source. The image capturing unit 17 can be implemented using an imaging device such as a color camera or an infrared camera that is capable of performing imaging of light having arbitrary wavelengths. The output unit 25 can be implemented using a display device, such as a liquid crystal display or a touchscreen display, meant for display output; or using a printing device, such as a printer, meant for print output; or using a combination of a display device and a printing device.

The memory unit 11 is used to store target patterns (images) to be projected by the projecting unit 15. More particularly, the memory unit 11 is used to store a first pattern, which is cyclic in nature, and a second pattern, which is configured with a first design for specifying periods of the first pattern. In the first embodiment, it is assumed that the first pattern is a sinusoidal wave pattern, and the first design is a geometrical pattern (such as random dots, circles, or straight lines) for specifying the sinusoidal wave periods. However, that is not the only possible case.

The selecting unit 13 selects target patterns to be projected by the projecting unit 15. In the first embodiment, the selecting unit 13 selects the first pattern and the second pattern from the patterns stored in the memory unit 11, and notifies the projecting unit 15 about those patterns as the target patterns to be projected.

The projecting unit 15 projects, onto a target for three-dimensional shape measurement (hereinafter, simply referred to as "target"), a first superimposed pattern that is obtained by superimposing the first pattern, which is cyclic in nature, and the second pattern, which is configured with a first design for specifying the periods of the first pattern. More particularly, the projecting unit 15 projects, onto the target, a first superimposed pattern that is obtained by superimposing a plurality of first patterns having mutually different phases and the second pattern that is configured with first designs for specifying the periods of the first patterns. Moreover, the projecting unit 15 projects a plurality of first patterns, which are superimposed to obtain the first superimposed pattern, at mutually different wavelengths.

In the first superimposed pattern, superimposition is done in such a way that, for each period of each of a plurality of first patterns, at least a single first design used for specifying the period is arranged. Moreover, it is assumed that, in the first superimposed pattern (the second pattern), each first design has a different (unique) design.

In the first embodiment, the explanation is given for an example in which sinusoidal wave patterns having a fixed difference in phase amount for each RGB channel are considered as a plurality of first patterns. However, that is not the only possible case. Herein, the sinusoidal wave pattern (sinusoidal wave) of the R channel is represented in Equation (1); the sinusoidal wave pattern (sinusoidal wave) of the G channel is represented in Equation (2); and the sinusoidal wave pattern (sinusoidal wave) of the B channel is represented in Equation (3).

$$I_R(x,y)=\alpha(x,y)\cos(\theta(x,y)-\phi(x,y))+\beta(x,y) \quad (1)$$

$$I_G(x,y)=\alpha(x,y)\cos\theta(x,y)+\beta(x,y) \quad (2)$$

$$I_B(x,y)=\alpha(x,y)\cos(\theta(x,y)+\phi(x,y))+\beta(x,y) \quad (3)$$

Herein, $\alpha(x, y)$ represents the amplitude of the corresponding sinusoidal wave; $\beta(x, y)$ represents an offset component; $\phi(x, y)$ represents the shift phase amount; $I_R(x, y)$ represents the luminance of pixels (x, y) of the sinusoidal wave pattern (image) of the R channel; $I_G(x, y)$ represents the luminance of pixels (x, y) of the sinusoidal wave pattern (image) of the G channel; and $I_B(x, y)$ represents the luminance of pixels (x, y) of the sinusoidal wave pattern (image) of the B channel.

Meanwhile, as far as the sinusoidal wave patterns are concerned, it is possible to use sinusoidal waves having arbitrary settings for the amplitude, the offset component, the shift phase amount, the frequency, and the direction.

Figure 2:
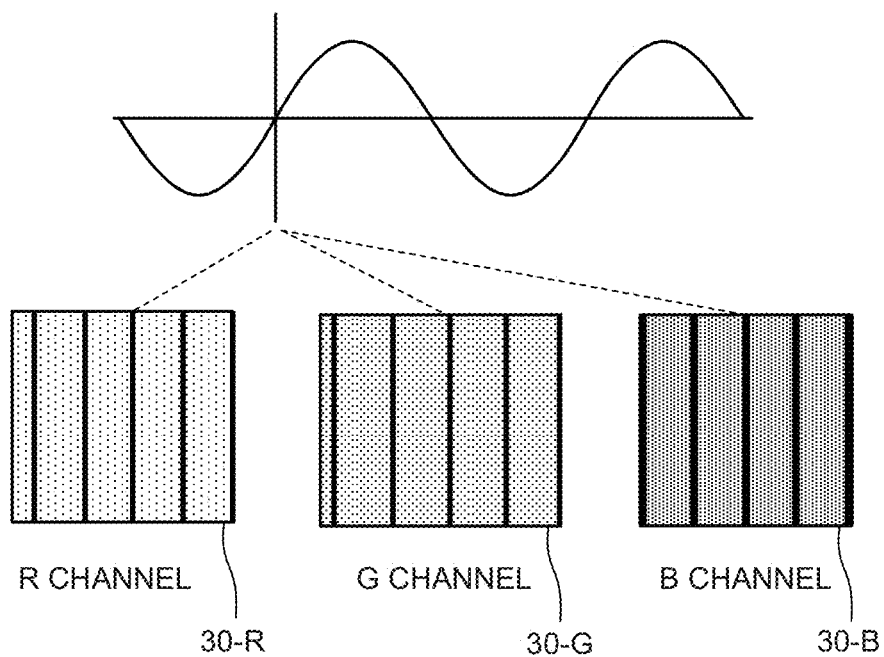
FIG. 2 is a diagram illustrating an example of a sinusoidal wave pattern of each of the RGB channels according to the first embodiment.

FIG. 2 is a diagram illustrating an example of a sinusoidal wave pattern of each of the RGB channels according to the first embodiment. In the example illustrated in FIG. 2, a sinusoidal wave pattern 30-R of the R channel, a sinusoidal wave pattern 30-G of the G channel, and a sinusoidal wave pattern 30-B of the B channel have the phases shifted therebetween by $2\pi/3$. More particularly, as given in Equations (1) to (3), it is assumed that the phase amount of the sinusoidal wave pattern 30-B is shifted backward by $2\pi/3$ with respect to the sinusoidal wave pattern 30-R. In the example illustrated in FIG. 2, the luminance values of the sinusoidal wave pattern 30-R, the sinusoidal wave pattern 30-G, and the sinusoidal wave pattern 30-B are illustrated in the form of a sinusoidal wave.

Figure 3:
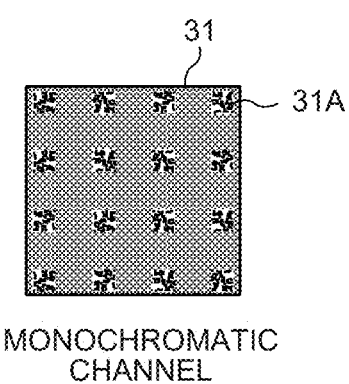
FIG. 3 is a diagram illustrating an exemplary random pattern according to the first embodiment.

In the first embodiment, the explanation is given for an example in which a random pattern configured with a random design is considered to be the second pattern. However, that is not the only possible case. FIG. 3 is a diagram illustrating an exemplary random pattern according to the first embodiment. In the example illustrated in FIG. 3, a random pattern 31 is the pattern of a monochromatic channel and has random designs (such as a random design 31A) arranged in a reticular manner at the intervals of the sinusoidal wave pattern periods. Meanwhile, each random design constituting a random pattern is a different (unique) design.

Figure 4:
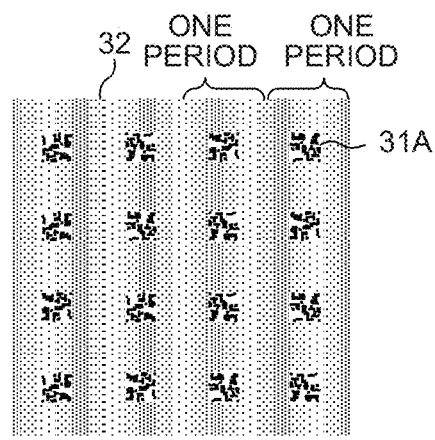
FIG. 4 is a diagram illustrating an exemplary superimposed pattern according to the first embodiment.

FIG. 4 is a diagram illustrating an exemplary first superimposed pattern according to the first embodiment. A first superimposed pattern 32 illustrated in FIG. 4 is obtained by the superimposition of the sinusoidal wave pattern 30-R, the sinusoidal wave pattern 30-G, the sinusoidal wave pattern 30-B, and the random pattern 31. As described earlier, in the random pattern 31, random designs are arranged in a reticular manner at the intervals of the sinusoidal wave pattern periods. For that reason, in the first superimposed pattern 32, the random designs (such as the random design 31A) are arranged for each period of each of the sinusoidal wave pattern 30-R, the sinusoidal wave pattern 30-G, and the sinusoidal wave pattern 30-B.

In the case of projecting the first superimposed pattern 32; the projecting unit 15 projects the sinusoidal wave pattern 30-R at the wavelength of the R channel, projects the sinusoidal wave pattern 30-G at the wavelength of the G channel, and projects the sinusoidal wave pattern 30-B at the wavelength of the B channel.

Meanwhile, as illustrated in FIG. 4, it is desirable that the random designs in the first superimposed pattern 32 (i.e., in the random pattern 31) have a smaller percentage than the percentage of the sinusoidal wave pattern 30-R, the sinusoidal wave pattern 30-G, and the sinusoidal wave pattern 30-B in the first superimposed pattern 32.

Meanwhile, the resolution of the first designs (the random designs) can be determined by calculating the minimum requisite pixel size for measurement based on the criteria such as the measuring distance, the focal length, and the pixel resolution of the measuring device 1. That is, the resolution of the first designs (the random designs) can be obtained by calculating the number of pattern pixels projected per pixel of the image capturing unit 17.

In the first embodiment, all three RGB channels are used as a plurality of first patterns. However, it is also possible to use at least a single channel. Moreover, for example, it is also possible to use the R channel as the first pattern and to use the B channel as the second pattern. In this way, if the channel (wavelength) of the first pattern is completely different than the channel (wavelength) of the second pattern, then the percentage of designs in the second pattern need not be reduced than the percentage of the first pattern.

Moreover, in the first embodiment, the explanation is given for an example in which RGB channels having visible wavelengths are used as the first pattern and the second pattern. However, that is not the only possible case. Alternatively, it is possible to use any arbitrary wavelength such as the wavelength of the infrared light.

The image capturing unit 17 captures the target, on which the projecting unit 15 has projected the first pattern, and obtains an image. In the first embodiment, since the projecting unit 15 projects the first superimposed pattern in visible light, the image capturing unit 17 is assumed to be an imaging device capable of receiving visible light. Thus, in the first embodiment, the image capturing unit 17 captures the target on which the first superimposed pattern is projected, and obtains an RGB image. However, in the case when the projecting unit 15 projects the first superimposed pattern in infrared light, an imaging device capable of receiving infrared light can be used as the image capturing unit 17.

Meanwhile, a random design in the first superimposed pattern is a geometrical pattern resistant to reflected light. Hence, even in the case when at least a portion of the target is not smooth in nature and lacks in reflection characteristics to be able to sufficiently reflect the projected patterns, it is likely that the random designs are reflected to a satisfactory extent. As a result, even if a portion of the first patterns disappears in the image taken by the image capturing unit 17, it is likely that the random designs are captured.

Moreover, monochromatic channels are assigned to the random designs in the first superimposed pattern. For that reason, even in the case when the light having the wavelength of any one of the RGB channels is not reflected from the target, as long as the light having the wavelengths of the remaining channels is reflected from the target, the random designs can be captured in the image taken by the image capturing unit 17.

Herein, as long as at least a single image capturing unit 17 is installed, it serves the purpose. Alternatively, for example, it is also possible to use a plurality of stereo cameras. Moreover, it is assumed that the calibration between the projecting unit 15 and the image capturing unit 17 or the calibration between the stereo cameras is done in advance.

The first calculating unit 19 performs matching of the first design present in the first superimposed pattern captured in the image, which is taken by the image capturing unit 17, with the first design present in the first superimposed pattern; and calculates the correspondence between a second superimposed pattern, which points to the first superimposed pattern captured in the image, and the first superimposed pattern. More particularly, the first calculating unit 19 uses the matching result and a first phase value, which is the phase value of the first superimposed pattern to calculate a second phase value that is the phase value of the second superimposed pattern; and calculates the correspondence between the second superimposed pattern and the first superimposed pattern using the first phase value and the second phase value. More specifically, as the correspondence between the second superimposed pattern and the first superimposed pattern, the first calculating unit 19 calculates corresponding points between the second superimposed pattern and the first superimposed pattern.

Given below is the detailed explanation about the calculation of the correspondence between the second superimposed pattern and the first superimposed pattern performed by the first calculating unit 19.

Firstly, the first calculating unit 19 separates the RGB image, which is taken by the image capturing unit 17, into different images each corresponding to one of the RGB channels (an example of separated images). Herein, the spectral intensity characteristics of the pattern light projected by the projecting unit 15 are different than the spectral intensity characteristics of the image taken by the image capturing unit 17. Hence, in order to achieve consistency in both color spaces, it is desirable that color calibration is performed in advance. In the case when the projecting unit 15 projects the first superimposed pattern in infrared light, then the first calculating unit 19 can separate the image that is taken by the image capturing unit 17 according to infrared wavelengths.

Then, the first calculating unit 19 calculates the phase value of the second superimposed pattern (more specifically, a sinusoidal wave pattern) using at least one of the separated images corresponding to the RGB channels. More particularly, from the luminance value of each pixel in each of the separated images corresponding to the RGB channels, the first calculating unit 19 calculates the phase value in that pixel using Equation (4) given below.

$$\theta(x, y) = \tan^{-1}\left(\tan\left(\frac{\phi(x, y)}{2}\right) \cdot \left(\frac{I_R(x, y) - I_B(x, y)}{2I_G(x, y) - I_R(x, y) - I_B(x, y)}\right)\right) \quad (4)$$

Herein, $\phi(x, y)$, $I_R(x, y)$, $I_G(x, y)$, and $I_B(x, y)$ are identical to Equations (1) to (3). However, each of $I_R(x, y)$, $I_G(x, y)$, and $I_B(x, y)$ does not represent the luminance value of the pattern projected by the projecting unit 15 but represents the luminance value of the pixels (x, y) in the image taken by the image capturing unit 17 (more specifically, the pixels (x, y) in each separated image corresponding to one of the RGB channels).

If it is assumed that a vicinity pixel $(x_i, y_i)$ present in the vicinity of a pixel of interest (x, y) has $\alpha(x, y)$, $\beta(x, y)$, and $\theta(x, y)$ to be constant; then, from the luminance value of each pixel in a separated image corresponding to one of the RGB channels, the first calculating unit 19 calculates the phase value in that pixel using Equation (5) given below.

$$\operatorname{argmin}[\alpha, \beta, \theta] = \sum_{i=1}^{n} [I(x_i, y_i) - \alpha\cos(\theta + \phi(x, y)) - \beta]^2 \quad (5)$$

Herein, $\alpha(x, y)$ represents the amplitude of the corresponding sinusoidal wave; $\beta(x, y)$ represents an offset component; $\phi(x, y)$ represents the shift phase amount; $I(x_i, y_i)$ represents the luminance value of the vicinity pixel $(x_i, y_i)$ present in the vicinity of the pixel of interest (x, y). In this way, in Equation (5), from the luminance values of n number of points (at least three points or more), it becomes possible to obtain such $\alpha$, $\beta$, and $\theta$ which enable minimizing the residual sum of squares.

Subsequently, the first calculating unit 19 integrates such areas in the RGB image, which is taken by the image capturing unit 17, in which the calculated phase value is continuously changing (i.e., areas corresponding to $-\pi \sim \pi$) into a single area and then divides that area. More particularly, the first calculating unit 19 obtains the differences in phase values among adjacent pixels and, if a difference is equal to or smaller than a threshold value (for example, if a difference is close to the real number "0"), integrates such pixels into the same area.

Figure 5:
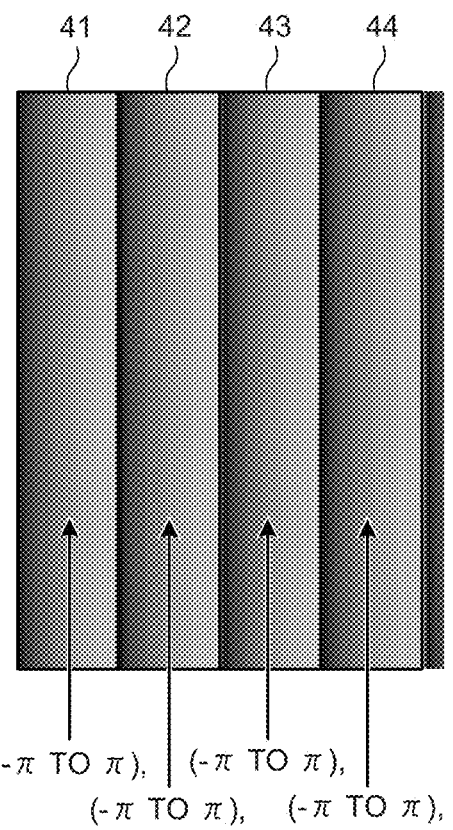
FIG. 5 is a diagram illustrating an example of an area division result according to the first embodiment.

FIG. 5 is a diagram illustrating an example of the area division result according to the first embodiment. In the example illustrated in FIG. 5, the RGB image taken by the image capturing unit 17 is divided into areas 41 to 44 having the phase value (−π~π). Meanwhile, in the example illustrated in FIG. 5, the random design included in the RGB image is not illustrated.

Then, the first calculating unit 19 performs matching of the random design in the RGB image, which is taken by the image capturing unit 17, with the random design in the first superimposed pattern, which is projected by the projecting unit 15; and converts the phase value having the repetitive value (−π~π) into a continuous value.

Figure 6:
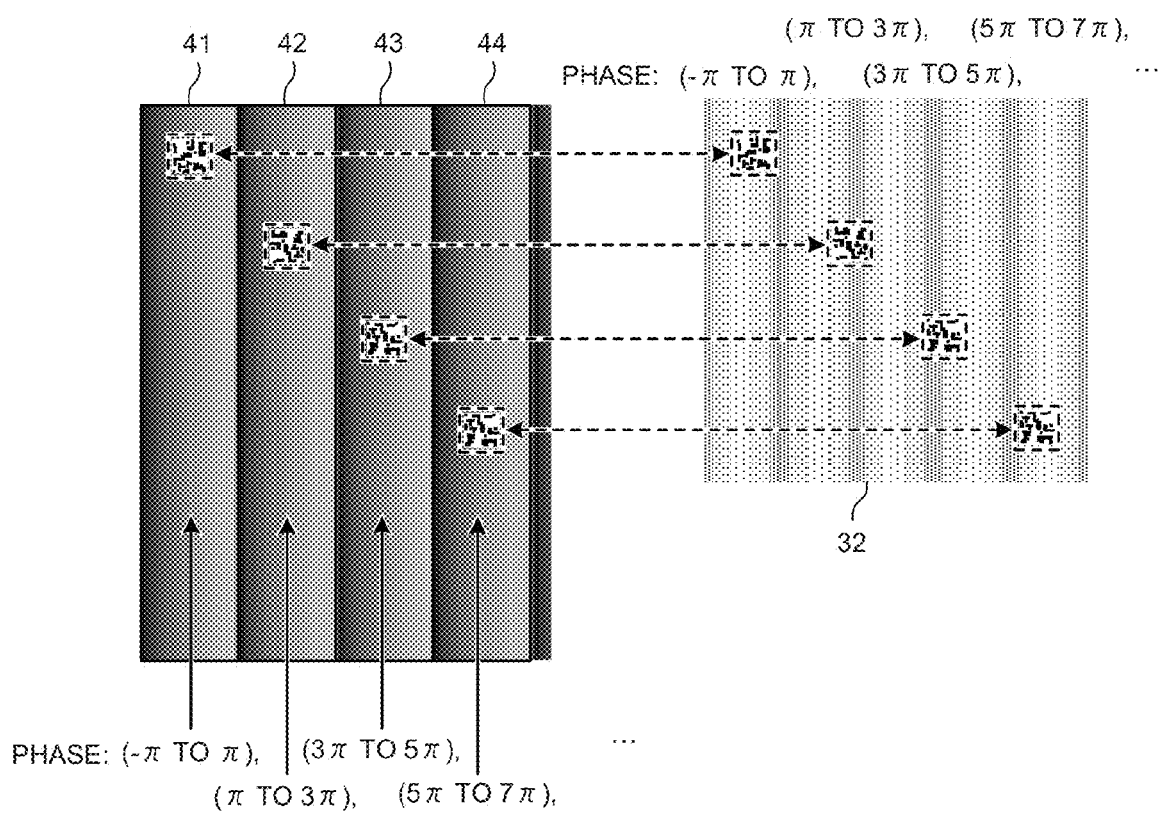
FIG. 6 is an explanatory diagram illustrating an example of a phase value conversion method according to the first embodiment.

FIG. 6 is an explanatory diagram illustrating an example of a phase value conversion method according to the first embodiment. In the example illustrated in FIG. 6, only some portion of the random designs is illustrated and some portion is not illustrated.

As illustrated in FIG. 6, for each divided area in the RGB image taken by the image capturing unit 17, the first calculating unit 19 performs matching of the random design present in that area with the random design in the first superimposed pattern 32 projected by the projecting unit 15. As far as the evaluation of matching is concerned, it is possible to make use of normalized correlation.

Subsequently, if the two random designs match with each other, the first calculating unit 19 sets the phase value (more specifically, the number of periods of the phase) of the first superimposed pattern 32 (more specifically, the sinusoidal wave patterns 30-R, 30-G, and 30-B), which is specified by the random design in the first superimposed pattern 32, as the phase value of the areas specified by the random design in the RGB image.

As a result, in the example illustrated in FIG. 6, in the RGB image, which is taken by the image capturing unit 17, the phase value of the area 41 is converted into (−π~π); the phase value of the area 42 is converted into (π~3π); and the phase value of the area 43 is converted into (3π~5π); the phase value of the area 44 is converted into (5π~7π); and the phase value of the RGB image taken by the image capturing unit 17 is converted from the repetitive value of (−π~π) into a continuous value (−π~7π).

In this way, in the first embodiment, matching of random designs is performed so as to calculate the phase value of the RGB image taken by the image capturing unit (i.e., the phase value of the second superimposed pattern). As described earlier, a random design is resistant to reflected light. Moreover, in the first embodiment, monochromatic channels are assigned to the random designs. For that reason, even in the case when the target is not smooth in nature and lacks in reflection characteristics to be able to sufficiently reflect the projected patterns, it is still possible to calculate the phase value of the RGB image taken by the image capturing unit 17 (i.e. the phase value of the second superimposed pattern).

Subsequently, the first calculating unit 19 makes use of the phase value of the RGB image taken by the image capturing unit 17 (i.e., the phase value of the second superimposed pattern) and the phase value of the first superimposed pattern (i.e., the first phase value), and calculates corresponding points between the RGB image taken by the image capturing unit 17 (i.e., the second superimposed pattern) and the first superimposed pattern.

The third calculating unit 21 calculates a degree of reliability of the phase value calculated by the first calculating unit 19 (i.e., calculates a degree of reliability of the second phase value). That is done because an error occurs in the phase value (the second phase value), which is calculated by the first calculating unit 19, due to the reflection characteristics of the target and the color characteristics of the projecting unit 15 and the image capturing unit 17.

More particularly, with respect to each separated image obtained by separating the RGB image, which is taken by the image capturing unit 17, according to the wavelength of one of the RGB channels, the third calculating unit 21 calculates the difference between the luminance value of that separated image and the luminance value of the first pattern projected at the wavelength used in obtaining that separated image; and calculates the degree of reliability based on a plurality of differences.

For example, using Equation (6) given below, the third calculating unit 21 calculates an error in the phase value (the second phase value) calculated by the first calculating unit 19.

$$\text{Error} = \sqrt{E_R^2 + E_G^2 + E_B^2} \quad (6)$$

Herein, it is indicated that, greater the value of Error, greater is the error in the phase value (the second phase value) calculated by the first calculating unit 19. Moreover, $E_R$ is obtained using Equation (7) given below; $E_G$ is obtained using Equation (8) given below; and $E_B$ is obtained using Equation (9) given below.

$$E_R = I_R(x,y) - \{\alpha(x,y)\cos(\theta(x,y) - \phi(x,y)) + \beta(x,y)\} \quad (7)$$

$$E_G = I_G(x,y) - \{\alpha(x,y)\cos\theta(x,y) + \beta(x,y)\} \quad (8)$$

$$E_B = I_B(x,y) - \{\alpha(x,y)\cos(\theta(x,y) + \phi(x,y)) + \beta(x,y)\} \quad (9)$$

Then, the third calculating unit 21 calculates the degree of reliability of the calculated phase value (the second phase value) using a formula "Reliability=1−Error". That is, smaller the value of Error, higher is the degree of reliability of the calculated phase value (the second phase value). In contrast, greater the value of Error, lower is the degree of reliability of the calculated phase value (the second phase value).

The second calculating unit 23 calculates the three-dimensional shape from the correspondence between the second superimposed pattern and the first superimposed pattern as calculated by the first calculating unit 19. More particularly, from among the corresponding points between the second superimposed pattern and the first superimposed pattern calculated by the first calculating unit 19, the second calculating unit 23 makes use of the corresponding points that are calculated using the phase value (the second phase value) for which the degree of reliability calculated by the third calculating unit 21 is greater than a threshold value, and calculates the three-dimensional shape of the target. Herein, for example, the threshold value can be set to be smaller than the real number "1" and close to the real number "1".

As far as the method of calculating the three-dimensional shape using the phase value is concerned, it is possible to implement, for example, the triangulation method that is implemented in "High-precision three-dimensional measurement using the phase shift method and the Gray code method" ViEW 2005, December 2005.

The output unit 25 outputs the three-dimensional shape of the target that has been calculated by the second calculating unit 23.

Figure 7:
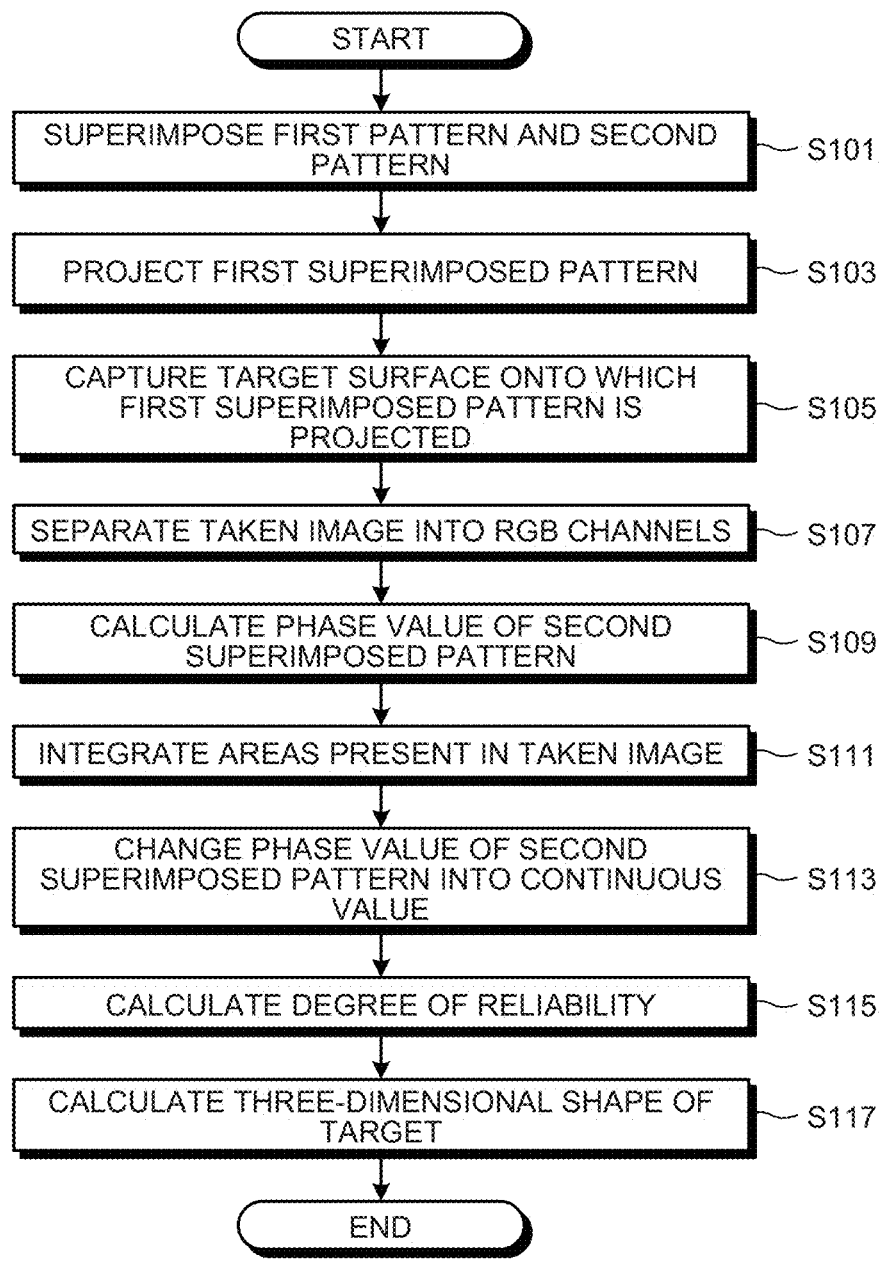
FIG. 7 is a flowchart for explaining a sequence of operations performed according to the first embodiment.

FIG. 7 is a flowchart for explaining a sequence of operations performed in the measuring device 1 according to the first embodiment.

Firstly, the projecting unit 15 superimposes a first pattern, which is cyclic in nature, and a second pattern, which is configured with a first design for specifying the periods of the first pattern, (Step S101) and projects a first superimposed pattern onto a target (Step S103).

Then, the image capturing unit 17 captures the target, onto which the projecting unit 15 has projected the first superimposed pattern, to obtain an image (Step S105).

Subsequently, the first calculating unit 19 separates the RGB image, which is taken by the image capturing unit 17, into different images each corresponding to one of the RGB channels (Step S107).

Then, using at least either one of the separated images corresponding to the RGB channels, the first calculating unit 19 calculates the phase value of a second superimposed pattern (more specifically, a sinusoidal wave pattern) (Step S109).

Subsequently, the first calculating unit 19 integrates such areas in the RGB image, which is taken by the image capturing unit 17, in which the calculated phase value is continuously changing (i.e., areas corresponding to $-\pi \sim \pi$) into a single area and then divides that area (Step S111).

Then, the first calculating unit 19 performs matching of the random design in the RGB image, which is taken by the image capturing unit 17, with the random design in the first superimposed pattern, which is projected by the projecting unit 15; and converts the phase value having the repetitive value ($-\pi \sim \pi$) into a continuous value (Step S113). Subsequently, the first calculating unit 19 makes use of the phase value of the RGB image taken by the image capturing unit 17 (i.e., a second phase value) and the phase value of the first superimposed pattern (i.e., a first phase value), and calculates corresponding points between the RGB image taken by the image capturing unit 17 (i.e., the second superimposed pattern) and the first superimposed pattern.

Then, with respect to each separated image obtained by separating the RGB image, which is taken by the image capturing unit 17, according to the wavelength of one of the RGB channels, the third calculating unit 21 calculates the difference between the luminance value of that separated image and the luminance value of the first pattern projected at the wavelength used in obtaining that separated image; and calculates the degree of reliability based on a plurality of differences (Step S115).

Subsequently, from among the corresponding points between the second superimposed pattern and the first superimposed pattern as calculated by the first calculating unit 19, the second calculating unit 23 makes use of the corresponding points that are calculated using the phase value (the second phase value) for which the degree of reliability calculated by the third calculating unit 21 is greater than a threshold value, and calculates the three-dimensional shape of the target (Step S117).

In this way, in the first embodiment, the phase value of the image taken by an image capturing unit (i.e., the phase value of a second superimposed pattern) is calculated by performing design matching. Hence, even in the case when at least a portion of a target lacks in reflection characteristics, it becomes possible to calculate the phase value of the image (the second superimposed pattern) and to measure the three-dimensional shape of the target. Moreover, even in the case when the target surface of a target for measurement is not smooth in nature and when a portion of that target lacks in reflection characteristics, it is possible to measure the three-dimensional shape of the target.

Furthermore, in the first embodiment, the three-dimensional shape of a target is measured using only such a phase value from among the calculated phase values for which the degree of reliability is greater than a threshold value. As a result, it becomes possible to enhance the measurement accuracy while measuring the three-dimensional shape of the target.

Second Embodiment

In a second embodiment, the explanation is given for another example of calculating the degree of reliability. The following explanation is given with the focus on the differences with the first embodiment. The constituent elements identical to the constituent elements according to the first embodiment are referred to by the same names/reference numerals, and the explanation thereof is not repeated.

Figure 8:
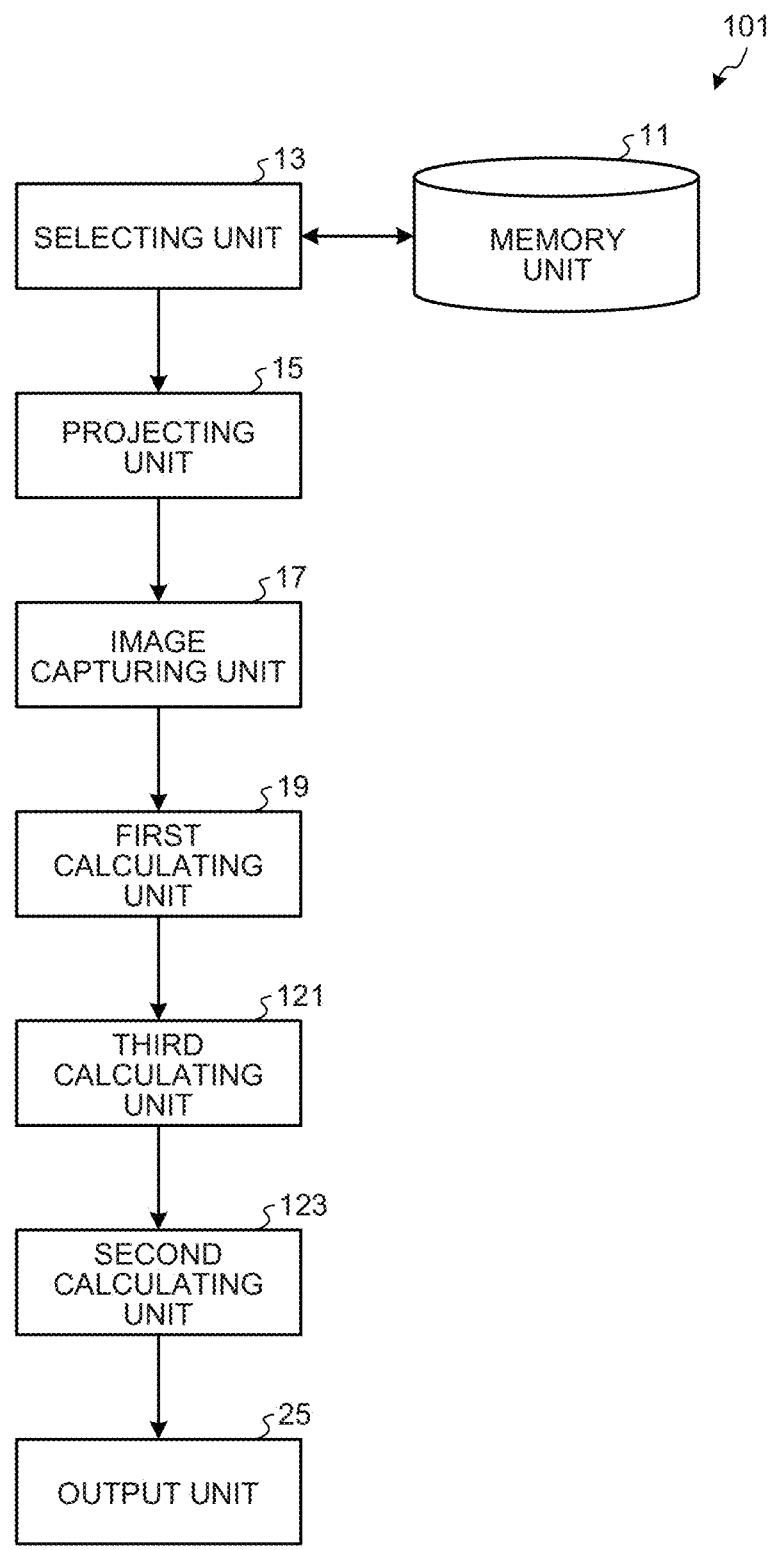
FIG. 8 is a configuration diagram illustrating an example of a measuring device according to a second embodiment.

FIG. 8 is a configuration diagram illustrating an example of a measuring device 101 according to the second embodiment. As illustrated in FIG. 8, in the measuring device 101 according to the second embodiment, a third calculating unit 121 and a second calculating unit 123 are different from the first embodiment.

In the second embodiment, it is assumed that the first calculating unit 19 calculates the phase value (the second phase value) of each of the RGB channels using Equation (5) given above.

Then, the third calculating unit 121 calculates the degree of reliability of the phase value (the second phase value) of each of the RGB channels. More particularly, with respect to each separated image obtained by separating the RGB image, which is taken by the image capturing unit 17, according to the wavelength of one of the RGB channels, the third calculating unit 121 calculates the difference between the luminance value of that separated image and the luminance value of the first pattern projected at the wavelength used in obtaining that separated image; and calculates the degree of reliability based on the difference.

For example, using Equation (10) given below, the third calculating unit 121 calculates an error in the phase value (the second phase value) of each of the RGB channels as calculated by the first calculating unit 19.

$$\text{Error} = \sum_{i=1}^{n} [I(x_i, y_i) - \alpha \cos(\theta + \phi(x, y)) - \beta]^2 \qquad (10)$$

Herein, $\alpha$ represents the amplitude of the corresponding sinusoidal wave; $\beta$ represents an offset component; and $\phi$ represents a shift phase amount. Moreover, $\alpha$, $\beta$, and $\phi$ are parameters of the first pattern projected by the projecting unit 15 and are known values. $I(x_i, y_i)$ represents the luminance value of the vicinity pixel $(x_i, y_i)$ present in the vicinity of the pixel of interest $(x, y)$.

In this way, in Equation (10), from the luminance values of n number of points (at least three points or more), it becomes possible to obtain Error that represents the error in the phase value.

Thus, with respect to each separated image obtained by the first calculating unit 19 corresponding to one of the RGB channels, the third calculating unit 121 calculates Error, which represents the error in the corresponding phase, using Equation (10).

Then, according to the formula "Reliability=1−Error", the third calculating unit 121 calculates the degree of reliability of the phase value (the second phase value) of each of the RGB channels.

From among the corresponding points between the second superimposed pattern and the first superimposed pattern calculated by the first calculating unit 19, the second calculating unit 123 makes use of the corresponding points that either are calculated using a phase value (the second phase value) having the degree of reliability greater than a threshold value from among the degrees of reliability calculated by the third calculating unit 121 or are calculated using the phase value (the second phase value) corresponding to the wavelength of the channel having the highest degree of reliability from among the degrees of reliability calculated by the third calculating unit 121; and calculates the three-dimensional shape of the target.

For example, if the phase value (the second phase value) of the R channel has the highest degree of reliability, then the third calculating unit 121 calculates the three-dimensional shape of the target using the corresponding points that are calculated using the phase value (the second phase value) of the R channel.

In this way, in the second embodiment, the degree of reliability of the phase value of each of the RGB channels is calculated. Then, the three-dimensional shape of a target is calculated using the phase value of the wavelength having the highest degree of reliability. As a result, it becomes possible to enhance the measurement accuracy while measuring the three-dimensional shape of the target.

Third Embodiment

In a third embodiment, the explanation is given for an example in which the degrees of reliability are referred to while selecting the wavelength to be used in projection. The following explanation is given with the focus on the differences with the second embodiment. Moreover, the constituent elements identical to the constituent elements according to the second embodiment are referred to by the same names/reference numerals, and the explanation thereof is not repeated.

Figure 9:
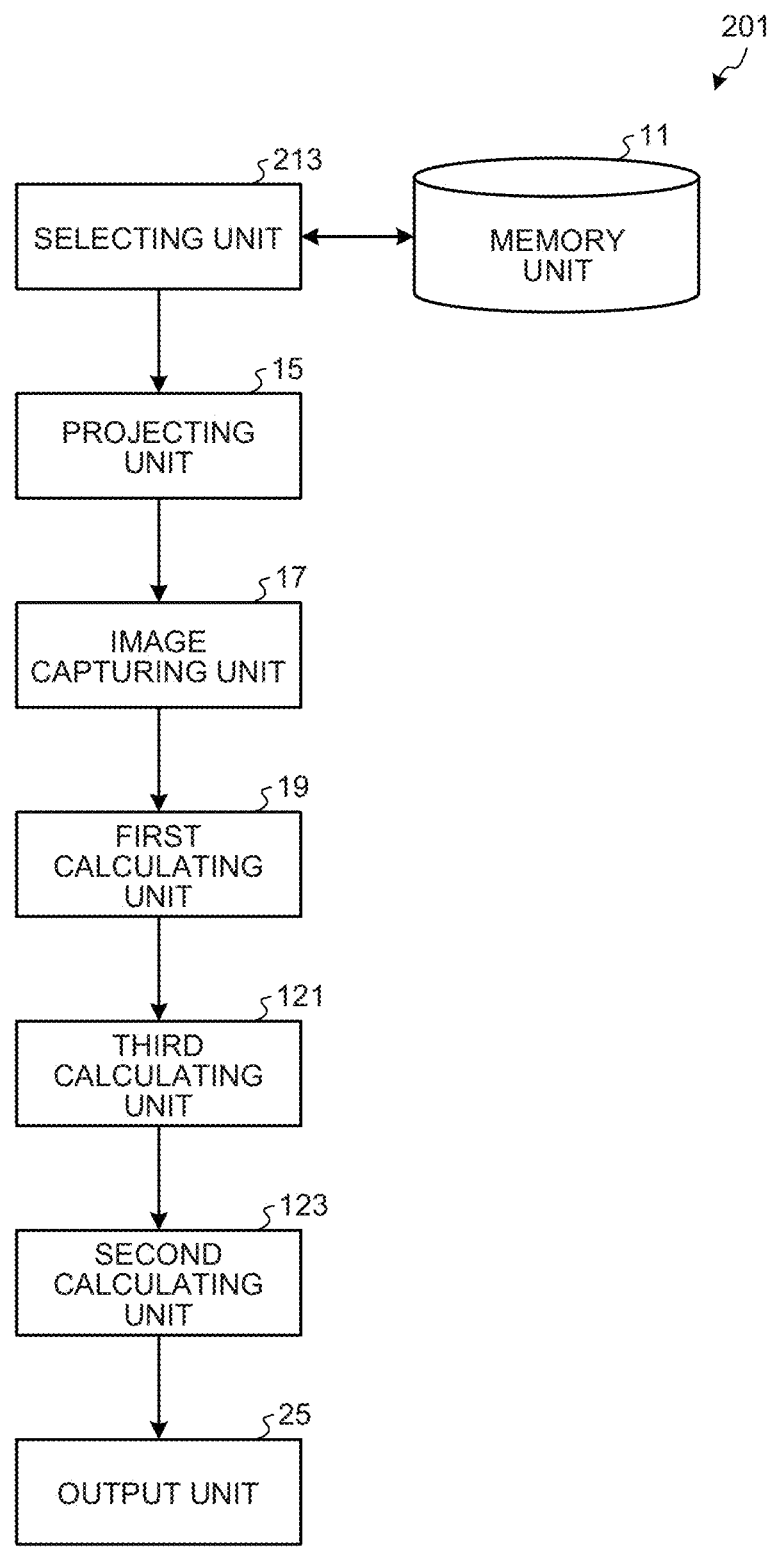
FIG. 9 is a configuration diagram illustrating an example of a measuring device according to a third embodiment.

FIG. 9 is a configuration diagram illustrating an example of a measuring device 201 according to the third embodiment. As illustrated in FIG. 9, in the measuring device 201 according to the third embodiment, a selecting unit 213 is different from the second embodiment.

The selecting unit 213 selects the wavelengths having the respective degrees of reliability, which are calculated by the third calculating unit 121, greater than a threshold value and notifies the projecting unit 15 about those wavelengths. That is done because, if the light having the wavelength of a channel of a low degree of reliability is used, then there is a possibility that a pattern projected onto a target is not reflected to a satisfactory extent due to the reflection intensity (reflection characteristics) of the target.

Then, the projecting unit 15 projects the first superimposed pattern with the light having the wavelengths selected by the selecting unit 213. For example, if the selecting unit 213 selects the R channel and the G channel from among the RGB channels, then the projecting unit 15 projects the first superimposed pattern by assigning the sinusoidal wave pattern to the R channel and assigning the random pattern to the G channel.

Figure 10:
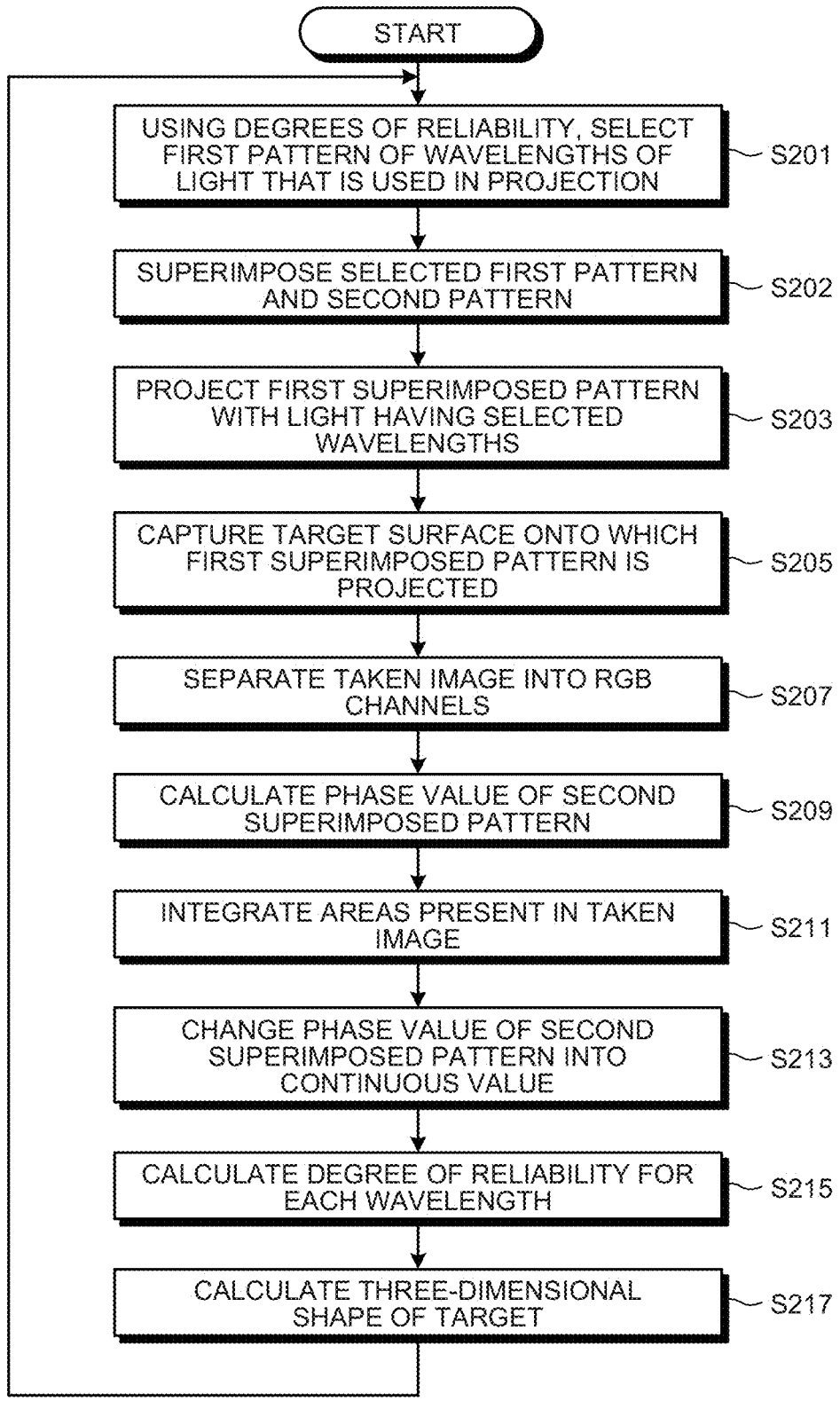
FIG. 10 is a flowchart for explaining a sequence of operations performed according to the third embodiment.

FIG. 10 is a flowchart for explaining a sequence of operations performed in the measuring device 201 according to the third embodiment.

Firstly, the selecting unit 213 refers to the degrees of reliability calculated by the third calculating unit 121 and selects the wavelengths of the light used for the purpose of projection (Step S201).

Then, the projecting unit 15 superimposes a first pattern, which is cyclic in nature, and a second pattern, which is configured with a first design for specifying the periods of the first pattern (Step S202), and projects a first superimposed pattern onto a target with the light having the wavelengths selected by the selecting unit 213 (Step S203).

Subsequently, the operations performed at Step S205 and Step S207 are identical to the operations performed at Step S105 and Step S107 in the flowchart illustrated in FIG. 7.

Moreover, the operations performed at Step S209 to Step S213 are identical to the operations performed at Step S109 to Step S113 in the flowchart illustrated in FIG. 7 expect for the fact that the first calculating unit 19 performs those operations with respect to the image of each of the RGB channels.

Subsequently, with respect to each separated image obtained by separating the RGB image, which is taken by the image capturing unit 17, according to the wavelength of one of the RGB channels, the third calculating unit 121 calculates the difference between the luminance value of that separated image and the luminance value of the first pattern projected at the wavelength used in obtaining that separated image; and calculates the degree of reliability based on the difference (Step S215).

Then, from among the corresponding points between the second superimposed pattern and the first superimposed pattern as calculated by the first calculating unit 19, the second calculating unit 123 makes use of the corresponding points that either are calculated using a phase value (the second phase value) having the degree of reliability greater than a threshold value from among the degrees of reliability calculated by the third calculating unit 121 or are calculated using the phase value (the second phase value) corresponding to the wavelength of the channel having the highest degree of reliability from among the degrees of reliability calculated by the third calculating unit 121; and calculates the three-dimensional shape of the target (Step S217).

In this way, in the third embodiment, a wavelength at which the patterns are reflected to a satisfactory extent from a target is automatically selected, and then the first superimposed pattern is projected at the selected wavelength. As a result, even in the case when at least a portion of a target lacks in reflection characteristics, it is likely that the phase value of the image (the second superimposed pattern) can be calculated and the three-dimensional shape of the target can be measured.

Modification Example

In the third embodiment, the explanation is given for an example in which the wavelength to be used for the purpose of projection is selected based on the degree of reliability. Alternatively, it is possible to select such a wavelength which is suitable for the location of the measuring device 201, and then to use the selected wavelength for the purpose of projection. In this case, location information of the measuring device 201 can be obtained using, for example, the global positioning system (GPS). With that, the first superimposed pattern can be projected with the light having the wavelength that is suitable for the location (such as indoors or outdoors) at which the measuring device 201 is installed.

Hardware Configuration

Figure 11:
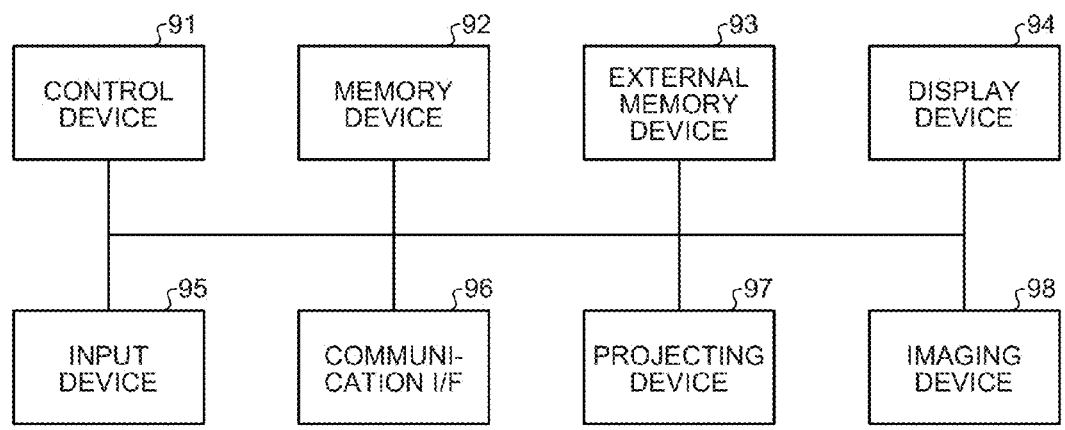
FIG. 11 is a diagram illustrating a hardware configuration of the measuring device according to the embodiments and the modification example.

FIG. 11 is a block diagram illustrating a hardware configuration of the measuring device according to the embodiments and the modification example described above. As illustrated in FIG. 11, the measuring device according to the embodiments and the modification example described above has the hardware configuration of a commonly-used computer that includes a control device 91 such as a central processing unit (CPU); a memory device 92 such as a read only memory (ROM) or a random access memory (RAM); an external memory device 93 such as a hard disk drive (HDD) or a solid state drive (SSD); a display device 94 such as a display; an input device 95 such as a mouse or a keyboard; a communication I/F 96; a projecting device 97 such as a projector; and an imaging device 98 such as a color camera.

The computer programs that are executed in the measuring device according to the embodiments and the modification example described above are stored in advance in a ROM. Alternatively, the computer programs that are executed in the measuring device according to the embodiments and the modification example described above can be recorded in the form of installable or executable files in a computer-readable recording medium such as a compact disk read only memory (CD-ROM), a compact disk readable (CD-R), a memory card, a digital versatile disk (DVD), or a flexible disk (FD). Still alternatively, the computer programs that are executed in the measuring device according to the embodiments and the modification example described above can be saved as downloadable files on a computer connected to the Internet or can be made available for distribution through a network such as the Internet.

Meanwhile, the computer programs that are executed in the measuring device according to the embodiments and the modification example described above contain a module for each of the abovementioned constituent elements to be implemented in a computer. As the actual hardware, for example, the control device 91 reads the computer programs from the external memory device 93 and runs them such that the computer programs are loaded in the memory device 92. As a result, the module for each of the abovementioned constituent elements is implemented in the computer.

As explained above, according to the embodiments and the modification example described above, three-dimensional shape measurement can be performed even for such a target for measurement which includes a portion lacking in reflection characteristics. Moreover, three-dimensional shape measurement can be performed even for such a target for measurement in which the target surface is not smooth in nature and when a portion of that target lacks in reflection characteristics.

For example, unless contrary to the nature thereof, the steps of the flowcharts according to the embodiments described above can have a different execution sequence, can be executed in plurality at the same time, or can be executed in a different sequence every time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measuring device comprising:
a projector configured to project, onto a target, a first superimposed pattern which is obtained by superimposing a first pattern having a periodic change and a second pattern configured with a first design for specifying a period of the first pattern; and
a processor configured to execute a program to implement an image capturing unit and a first calculator, wherein
the image capturing unit is configured to capture the target, onto which the first superimposed pattern is projected to obtain an image; and
the first calculator is configured to perform matching of the first design taken by the image capturing unit, which is included in the first superimposed pattern in the image, with the first design projected by the projector, and calculate correspondence between a second superimposed pattern, which points to the first superimposed pattern captured in the image, and the first superimposed pattern.

2. The device according to claim 1, wherein
in the first superimposed pattern, at least a single first design is arranged for each period of the first pattern,
the first calculator is configured to calculate, by using a result of the matching and a first phase value of the first superimposed pattern, a second phase value of the second superimposed pattern, and calculate, by using the first phase value and the second phase value, the correspondence between the second superimposed pattern and the first superimposed pattern.

3. The device according to claim 2, wherein the processor is configured to execute the program to further implement a second calculator; and
the second calculator is configured to calculate a three-dimensional shape of the target by referring to the correspondence between the second superimposed pattern and the first superimposed pattern.

4. The device according to claim 3, wherein
as the correspondence between the second superimposed pattern and the first superimposed pattern, the first calculator is configured to calculate a corresponding point between the second superimposed pattern and the first;
the processor is configured to execute the program to further implement a third calculator;
the third calculator is configured to calculate a degree of reliability of the second phase value; and
the second calculator is configured to calculate the three-dimensional shape using a corresponding point calculated using a second phase value which has the degree of reliability greater than a threshold value.

5. The device according to claim 4, wherein
the first pattern is plurality in number,
each of the plurality of first patterns has a mutually different phase, and
the first design represents a design for specifying the periods of each of the plurality of first patterns.

6. The device according to claim 5, wherein
the projector is configured to project, at a different wavelength, each of the plurality of first patterns, which are superimposed as the first superimposed pattern,
for each separated image obtained by separating the image according to the wavelengths, the third calculator is configured to calculate a difference between a luminance value of the separated image and a luminance value of a first pattern projected at a wavelength used in obtaining that separated image; and calculate the degree of reliability based on the plurality of differences that are calculated.

7. The device according to claim 5, wherein
the projector is configured to project, at a different wavelength, each of the plurality of first patterns which are superimposed as the first superimposed pattern,
for each separated image obtained by separating the image according to the wavelengths, the third calculator is configured to calculate a degree of reliability based on the difference between a luminance value of the separated image and a luminance value of a first pattern projected at the wavelength used in obtaining that separated image.

8. The device according to claim 7, wherein
the processor is configured to execute the program to further implement a selecting unit;
the selecting unit is configured to select a wavelength for which the degree of reliability is greater than a threshold value; and
the projector is configured to project the first superimposed pattern with light having the selected wavelength.

9. The device according to claim 1, wherein
the processor is configured to execute the program to further implement a selecting unit;
the selecting unit is configured to select a wavelength that is suitable for a location of the measuring device; and
the projector is configured to project the first superimposed pattern with light having the selected wavelength.

10. The device according to claim 1, wherein the first pattern is a sinusoidal wave pattern.

11. The device according to claim 1, wherein the first design is a geometrical design.

12. A measuring method comprising:
projecting, onto a target, a first superimposed pattern which is obtained by superimposing a first pattern having a periodic change and a second pattern configured with a first design for specifying a period of the first pattern;
capturing the target, onto which the first superimposed pattern is projected to obtain an image; and
performing matching of the first design taken by an image capturing unit, which is included in the first superimposed pattern in the image, with the first design projected by a projecting unit and calculating correspondence between a second superimposed pattern, which points to the first superimposed pattern captured in the image, and the first superimposed pattern.

13. A computer program product comprising a computer readable medium containing a computer program, wherein the computer program, when executed by a computer, causes the computer to execute:
projecting, onto a target, a first superimposed pattern which is obtained by superimposing a first pattern having a periodic change and a second pattern configured with a first design for specifying a period of the first pattern;
capturing the target, onto which the first superimposed pattern is projected to obtain an image; and
performing matching of the first design taken by an image capturing unit, which is included in the first superimposed pattern in the image, with the first design projected by a projecting unit, and calculating correspondence between a second superimposed pattern, which points to the first superimposed pattern captured in the image, and the first superimposed pattern.

* * * * *